M. A. SCHIENKE.
LAWN SPRINKLER.
APPLICATION FILED AUG. 14, 1914.
1,171,068. Patented Feb. 8, 1916.
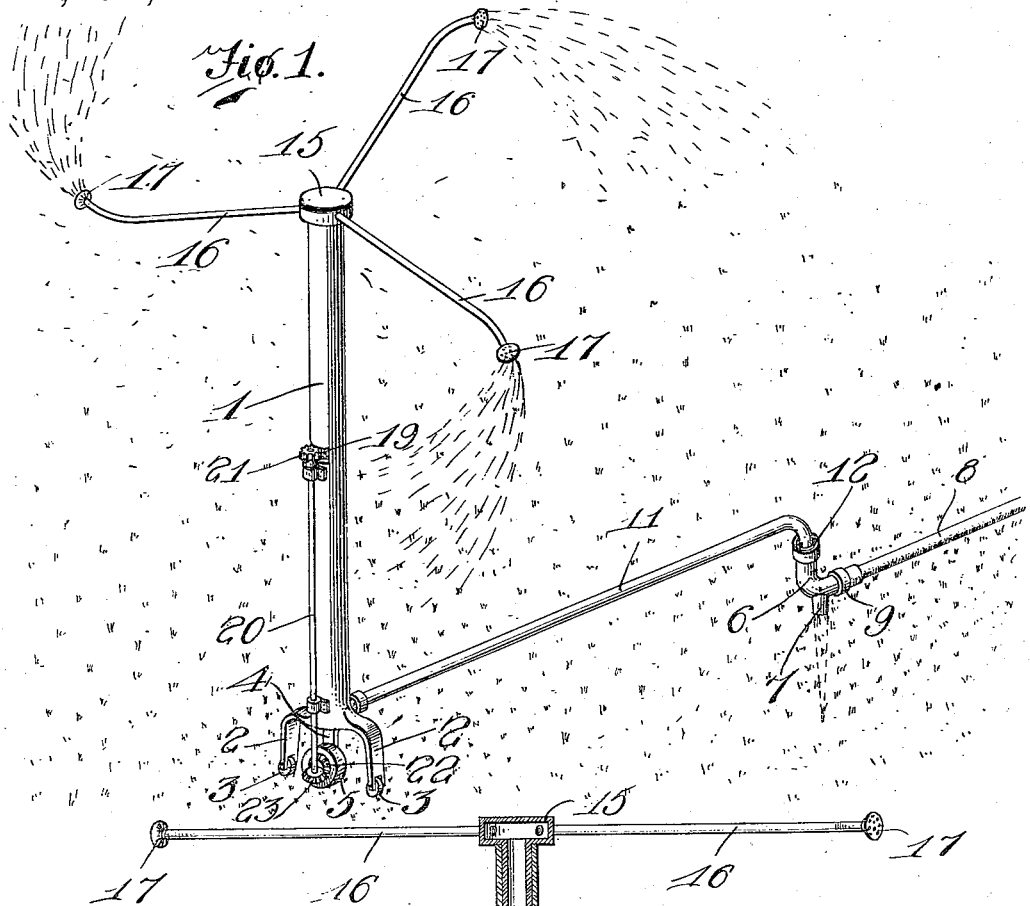
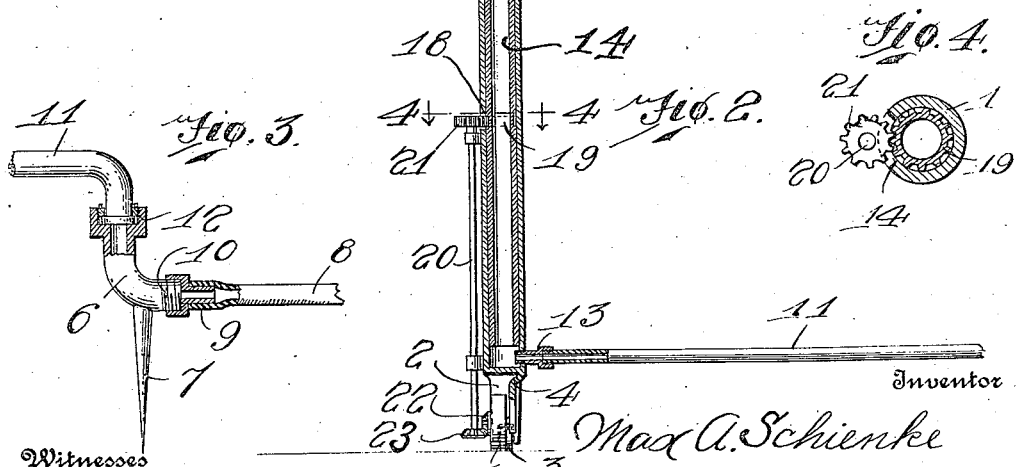

UNITED STATES PATENT OFFICE.

MAX A. SCHIENKE, OF BAY SHORE, NEW YORK.

LAWN-SPRINKLER.

1,171,068.　　　　Specification of Letters Patent.　　Patented Feb. 8, 1916.

Application filed August 14, 1914. Serial No. 856,840.

*To all whom it may concern:*

Be it known that I, MAX A. SCHIENKE, a citizen of the United States, residing at Bay Shore, Long Island, in the county of Suffolk and State of New York, have invented certain new and useful Improvements in Lawn-Sprinklers, of which the following is a specification.

An object of my invention is to provide an irrigating sprinkler which will cover a large area of lawn by comparison with the area to which the spray jets or head directs or throws the water.

A further object is to so construct the sprinkler that the normal operation thereof acts to automatically cause the parts to be operated to constantly change the center from which the sprays are directed.

With other objects in view, which will be referred to, my invention consists in the peculiar combination and novel arrangement of parts, such as will be hereinafter more fully described in connection with the accompanying drawings and more particularly pointed out in the appended claims.

In the drawings:—Figure 1 is a view in perspective showing my improved lawn sprinkler in use. Fig. 2 is a vertical sectional view through the mechanism of the device. Fig. 3 is a sectional view of fragmentary parts of the structure. Fig. 4 is a transverse sectional view taken on the line 4—4 of Fig. 2.

The main structure of my improved lawn sprinkler comprises a tubular standard 1 which at its base has the supporting legs 2, 2 extended to the sides and spread apart to provide against lateral overturning of this standard. The legs 2 have the supporting rolls 3 mounted on the lower ends thereof to rest on and travel over the ground, and an arm 4 formed to depend from the tubular standard 1 at a point between the supporting legs 2 has an operating wheel 5, journaled thereon.

An elbow 6, the structure of which is better disclosed in Fig. 3, has the spur or spike 7 secured thereon to be inserted into the ground and to hold the elbow in the upright position as disclosed in Fig. 1. The hose 8 has the usual coupling 9 on the end thereof and this elbow 6 has a screw-threaded end 10 provided to fit within and be connected by the coupling 9 with the hose 8. The pipe 11 has one end thereof bent at right angles and this right angularly disposed portion is journaled in the revoluble union 12 on the upper end of the elbow 6 so that the pipe 11 has free swinging movement in a circular path around the point at which this elbow 6 is secured by the spike or pin 7. At its free end this pipe 11 is connected by a union 13 with the lower end of the tubular standard 1 and in this way the parts are so arranged that water is supplied from the hose 8 direct through the elbow 6 and pipe 11 to the tubular standard 1.

A hollow stem 14 is mounted in the tubular standard 1 to have a liquid-tight connection around the outside thereof and this stem 14 is stopped slightly short of the point of connection of the union 13 to the standard 1, and thus the supply of water from the standard 1 is conducted to and through this stem 14 to the head 15 provided on the upper end thereof. A plurality of arms 16 made of tubing are connected with this head 15 to extend radially therefrom and to permit the passage of water from the head into the respective arms. Each of the arms 16 is bent slightly laterally at its outer end in a horizontal plane and the sprinkler heads 17 are mounted on the extreme ends of the arms 16 so that the water conducted through the stem 4 and through these arms 16 is permitted to pass from the spray head in a shower and to fall upon the ground around the standard 1.

About midway along the vertical extent of the standard 1, a portion of the wall thereof is cut-away as at 18 and the stem 14 has the gear teeth 19 provided therearound adjacent this cut-away portion 18. A shaft 20 is journaled in suitable bearings provided on the exterior of the standard 1 and at its upper end has a gear wheel 21 secured to mesh with and turn in the teeth 19 on the stem 14. A bevel gear wheel 22 is provided on the operating wheel 5 and the shaft 20 has the bevel gear 23 secured on the lower end thereof to mesh with this gear 22.

By reason of the fact that the arms 16 are curved slightly at their outer ends and the spray heads 17 are mounted on these curved ends, the spray or shower from the spray heads 17 is directed laterally and an impact is made by the water discharged therefrom against the air to cause the head 15 and consequently the stem 14 to be revolved within the tubular standard 1. This revolution of the stem 14 causes the toothed portion 19 to be carried around and through the engagement of the teeth of the gear wheel 21 with the teeth 19 of this stem 14, the shaft 20 is revolved and by reason of the fact that the miter gears 22 and 23 are in mesh a rotary motion is transmitted to the operating wheel 5. This operating wheel 5, as has been hereinbefore set forth, is arranged in contact with the ground of the lawn and through the turning thereof an impelling force is given to the standard 1 to cause this standard to be moved upon the operating wheel 5 and the supporting wheels 3 in a circular path around the connection at 12 with the elbow 6, the radius of which path is governed by the length of the pipe 11.

From the foregoing it will be seen that I have provided an irrigating sprinkler of the lawn sprinkler type which has the parts thereof so arranged that an area is covered which is considerably in excess of that which is sprinkled by a reaction sprayer of the stationary-standard type, and also it will be seen that the operation of the device is automatic during the normal use as a sprinkler.

While I have herein shown and described one specific form of my invention, it will be understood that slight changes might be made in the form and arrangement of the several parts without departing from the spirit and scope of my invention, and hence I do not wish to be limited thereto except for such limitations as the claims may import.

I claim:—

1. A lawn sprinkler comprising a supporting standard provided at its lower end with supporting feet, a supporting wheel mounted on each of said feet to carry the supporting standard, a fluid supply pipe connected with said supporting standard and provided with a swivel connection with the source of fluid supply so formed that the supporting standard may have movement upon the supporting wheels in a circular path, a hollow stem revolubly mounted in said standard, a revolving spray structure carried by said stem above the upper end of said standard, an operating wheel carried by said supporting standard to engage the ground, gear teeth formed on said operating wheel, gear teeth formed on said stem, substantially mid-way its vertical extent, said standard being cut away at a point intermediate its upper and lower ends adjacent the gear teeth on said stem, bearings mounted on said standard, a shaft journaled through said bearings, one end of said shaft carrying a gear wheel in mesh with the gear teeth on said operating wheel, and the other end of said shaft carrying a gear wheel in mesh with the teeth on said stem, whereby the rotation of said stem by said spray structure will cause a similar movement of said supporting wheel, substantially as described.

2. In a movable lawn sprinkler, a hollow supporting standard, an operating means carried by said standard to engage the ground, a hollow stem mounted in said standard, a spray structure carried by said stem, gear teeth formed on said stem, said standard provided with a cut-out intermediate its ends adjacent the gear teeth, gear teeth formed on said operating wheel, bearings, a shaft journaled through said bearings, a gear wheel carried on said shaft meshing with the gear teeth on said operating wheel, a gear wheel carried on said shaft projecting through the cut-out in said standard and meshing with the gear teeth on said stem, whereby rotation of said stem will cause a similar movement of said operating wheel, substantially as described.

In testimony whereof I affix my signature in presence of two witnesses.

MAX A. SCHIENKE.

Witnesses:
 RALPH C. HARRIS,
 JOSIAH C. ROBBINS.